Patented Aug. 22, 1933

1,923,420

UNITED STATES PATENT OFFICE 1,923,420

HEAT INSULATION MATERIAL

Ira H. Derby, Indianapolis, Ind., assignor to Peter C. Reilly, Indianapolis, Ind.

No Drawing. Application December 16, 1929
Serial No. 414,582

12 Claims. (Cl. 106—18)

The present invention relates to a carbonaceous insulator suitable for high temperature operations.

The most commonly employed insulating materials for high temperature operations are natural flake graphite, carbon black, or lamp black, but these are not altogether satisfactory.

Carbon black is usually produced by mixing natural gas with a limited supply of air and burning the resulting mixture. Generally, it may be stated that this is a very wasteful operation, producing a low yield of carbon possessing physical properties which do not particularly adapt it for high temperature insulating purposes.

Lamp black is produced by a similar process, but the reacting carbonaceous material, instead of being a gas consisting mainly of methane, is composed of various oily products. Lamp black obtained by the partial combustion of oils is not as valuable or as pure as carbon black produced by the combustion of natural gas.

In general, graphite, although least efficient, is most commonly used for insulating purposes, because of its freedom from dust, absence of gassing, and difficult combustibility. Carbon black and lamp black, while being better insulators, burn more readily, dust badly, and when heated produce large volumes of gas which are extremely troublesome.

As above set forth, all the carbons heretofore used for insulating purposes, while advantageous in some respects, have disadvantages which seriously interfere with their use as insulators, and their defects are greatly magnified in high temperature operations where extremely severe working conditions occur. For example, in the operation of high frequency or low frequency induction furnaces, very high temperatures are produced. In high frequency work, it is not uncommon to work with temperatures varying between 2500° and 3000° C., and it is, of course, obvious that as a matter of economy, the most highly efficient insulating medium must be used. This is of fundamental importance, since the greater the efficiency of the insulator, the greater the conservation of expensive electric energy.

In considering an insulator adapted to efficiently withstand high temperatures, as for example that produced in an electric furnace, although capable of generation in other types of heating units, the following fundamental properties are of paramount importance: The material must be an excellent heat insulator, a poor conductor of electricity, and relatively very difficult to burn. Further, it is obvious that the material must remain solid and be non-volatile at the high temperature employed. Where a non-electrical heating unit generating high temperature is employed, of course, the electrical conductivity of the insulating material is not of importance. When using insulators under high temperatures, it is difficult to prevent access of air and the resultant combustion, and therefore the more resistant the insulator is to oxidation, the greater the insulator efficiency.

The present invention has for its object the utilization, as an insulator, of the granular carbonaceous material having the properties set forth and produced by thermo-decomposition.

It has been discovered that carbonaceous materials produced as hereinafter set forth are extremely valuable as insulators in high temperature operations.

One form of carbon which is very satisfactory is that produced from the thermal decomposition of natural gas, by passing the gas through a highly heated closed system under such conditions as to prevent oxidation, and preferably in the presence of contact substances adapted to facilitate the decomposition of the gas into the elements carbon and hydrogen. Carbon black produced by such a process, or similar ones, is well known in the trade under the trade names "Thermatomic Carbon", "Thermax" and "Flex". All carbons of this character are carbons of thermal production by the decomposition of natural gas.

One variety of thermal carbon produced by the decomposition of natural gas is disclosed in U. S. Patent No. 1,478,730, issued December 25, 1923, to R. H. Brownlee and Roy H. Uhlinger. In this patent, it is stated the thermally produced carbon is gray in shade, is in a completely amorphous state, and is not fluffy in appearance, being completely distinguishable from the light, fluffy and glossy black carbon black known as the common commercial variety of carbon black before the Brownlee and Uhlinger invention. The special thermal carbon black is further distinguished from the common commercial carbon black by the advantageous property of weighing approximately 2.5 times as much as an equal volume of the former. However, the specific gravity or density of the thermal carbon black is between 1.8 and 1.9, which is but little higher than the ordinary variety of commercial carbon black.

While the color of the carbon black of special thermal decomposition is usually, as stated by Brownlee and Uhlinger in U. S. Patent No. 1,478,730 of a grayish shade, the color may vary somewhat depending on the operating conditions present during thermal decomposition, and the physical and chemical characteristics of the hydrocarbon thermally decomposed. However, the color is always clearly distinguishable from the ordinary carbon black of commerce.

The process of manufacturing "Thermatomic carbon" and carbons which, for the purpose of the present invention, are equivalent, is referred to in U. S. Patent No. 1,638,421, issued August 9, 1927 to the Thermatomic Carbon Company of Pittsburgh, Pa., as assignee of Roy H. Uhlinger. In this patent it is stated:

"The preferred and usual process of manufacturing 'Thermatomic' carbon is that described in the patents of Brownlee and Uhlinger, No. 1,478,730 and No. 1,520,115. According to the process of said patents, a hydrocarbon gas, usually natural gas, is decomposed by passage through a highly heated retort to yield the carbon. 'Thermatomic' carbon having or approximating the carbon of the 'thermal' production described in Brownlee and Uhlinger patents, may be obtained by modifications of the Brownlee and Uhlinger process, or by other processes; for example, air may be bled into the stream of gas passing into the heated retort of the Brownlee and Uhlinger apparatus, resulting in a limited partial combustion of the hydrocarbon without detrimentally affecting the desirable physical qualities of the carbon black. Instead of introducing air into the gas stream passing through the heated retort, other diluent gases may be used, such, for example, as hydrogen, which will serve to reduce the concentration of the hydrocarbon gas and sweep it more rapidly through the heated zone of the retort, as described, for example, in the co-pending application of Ellwood B. Spear and Robert L. Moore, Serial No. 61,149, filed October 7th, 1925. The carbons made by these other processes and particularly when a diluent gas is used to reduce the concentration of the hydrocarbon gas, while having a lower weight per unit volume and a darker color than the carbons manufactured by the specific process described in the Brownlee and Uhlinger patent, nevertheless possess the desired characteristics of stiffening rubber.

"The 'Thermatomic' carbon as made by the process of the Brownlee and Uhlinger patents has a dark gray color and a blue or violet blue undertone. These color characteristics are usually present, although perhaps in a somewhat modified degree, in 'Thermatomic' carbon made by other processes, such, for example, as the above mentioned modification of the Brownlee and Uhlinger process, in which a limited amount of air or other diluent gas is bled into the hydrocarbon gas as it passes to the gas decomposing retorts."

Another distinguishing characteristic of carbon black of thermal production and equivalent carbon blacks is that it is granular, and non-flocculent. These properties enable the carbon to be packed readily and uniformly. Usually carbons of this character are treated with $\frac{1}{10}$ of 1% of oil before shipping, and the presence of this small amount of oil aids in the packing of the carbon.

In connection with the use of "Thermatomic" carbon, as an insulating medium, it is desired to point out that carbon of this character packs fairly compactly with very little trouble. Lamp black and carbon black have a tendency to flow like water and are exceedingly difficult to pack. Due to the amorphous granular character of the carbon, when the latter is used as an insulator, even at extremely high temperatures such as present in a high frequency induction furnace, a uniform insulating body is maintained. Ordinary carbon blacks and lamp blacks are of a fluffy character and additionally produce large volumes of gas at high temperatures, the gas tending to disturb or in a measure agitate the fluffy particles preventing the maintenance of the desired uniform insulating body.

While it is preferred to use as a heat insulating medium the carbon black of thermal decomposition as described, artificially modified carbon, giving excellent results, may be produced by appropriate treatment of ordinary carbon black or lamp black. These materials, which in themselves are extremely unsatisfactory, may be modified so that the modified products will possess the desirable properties of carbon of special thermal decomposition, such as "Thermatomic", "Thermax" and "Flex" carbons, and be adapted for use as equally efficient and desirable insulators. For example, lamp black may be heated to a relatively high temperature, between 2500 and 3000°, and the resulting product approximates in insulating properties the properties of the special thermal blacks and in some respects superior. Heat insulators produced from modified carbons of the above character are claimed in a separate application, Serial Number 681,217, filed July 19, 1933.

Lamp black when so heated attains a density varying between approximately 2.11 to 2.15. Of course, when the lamp black is not heated to as high a temperature as 2500 to 3000° C., the density of the lamp black is materially less.

One of the standard methods of determining the insulating qualities of a carbonaceous material, with special respect to its property of combustibility, is to measure its reactivity with carbonic acid. This test is carried out as follows:

Carbonaceous material of definite degree of fineness is heated in a tube to 1000° C. The gases and evolved volatile material are removed by evacuating the system. Pure, dry carbon dioxide is then admitted and maintained and circulated in contact with the hot carbon until no further volume change of the gases result. This equilibrium mixture of gases is then analyzed for carbon dioxide and carbon monoxide. In the case of a series of carbons compared in this way the larger the percentage of carbon monoxide, or conversely the smaller the percentage of carbon dioxide in the gases, the greater the reactivity of the carbon.

Carbon black of thermal decomposition such as "Thermax" and "Flex" at 1000° C. react with carbon dioxide approximately .03 as readily as Acheson graphite and .05 as vigorously as natural graphite. These figures, of course, are by way of illustration and not limitation, but the reactivity of the carbons coming within the present invention are of the order stated.

It is difficult to state the distinguishing qualities of the carbon insulators coming within the terms of the present invention, but the above test furnishes one basis for definition. Broadly, therefore, the present invention covers any granular carbon of thermo-decomposition possessing the distinguishing characteristics that it packs more readily than ordinary carbon; at high temperatures it gases relatively little, and its reactivity with carbonic acid at 1000° C. is substantially less than that of natural or artificial graphite.

The insulating carbon of the present invention has a weight per cubic foot varying between 10 and 50 pounds, depending upon its physical characteristics. However, when utilizing thermatomic carbon, or its equivalent, the weight per cubic foot varies between 20 and 40 lbs. The carbon as packed, tamped or molded, has a pore space which may vary, but is preferably usually between 50 and 66%. It is obvious that the figures set forth are by way of example, and not limitation, as the pore space may, under some circumstances, vary between 90 and 50%. The degree of compactness of the insulator or, stated differently, its porosity, will somewhat influence its insulating value and, in some cases, an increase of five times the actual weight of the material in a given volume will increase the thermal conductivity by about 10%.

For good insulation, a high degree of porosity or free space is desirable, provided this porosity is made up of very minute pore spaces. It is, of course, difficult to lay down any rule as to the degree of packing, but when used as an induction furnace insulator, tapping to a pore space corresponding to the preferred percentages has given satisfactory results. While the carbon blacks of thermal production have a specific gravity or true density varying between 1.85 and 1.9, ordinary carbon black has a density of about 1.8. The density of lamp black, as stated, when heated to a high temperature of the order of 3000° C., varies between 2.11 to 2.15, and lamp black of this character approximates the insulating qualities of the carbon black of special thermal production. The reactivity of the carbon when heated to 1000° C. with carbon dioxide is a measure of its resistance to oxidation or, expressed differently, of its relative combustibility.

The electrical conductivity and heat conductivity of the carbon of the present invention somewhat parallel each other. The electrical resistance of the devolatilized material as measured by the standard methods used in testing granular substances, such as calcined carbon, approximates .050 ohms per cubic inch. Carbon of special thermal decomposition, which is amorphous and granular in state, has a mesh size of usually about 300 and the ash content is less than 1%.

The resulting material herein set forth is especially useful as an insulator in an induction furnace such as shown in U. S. application, Serial No. 358,553, filed April 27, 1929, by Ira H. Derby. The latter application is directed to the production of graphitic carbon from pitch, coke, coal tar, petroleum or like materials, and the graphitization process is carried out at a maximum temperature of about 2900°, this temperature being obtained by the use of an induction furnace.

The insulator herein disclosed may also be used in induction furnaces of the type set forth in U. S. Patents Nos. 1,694,791 and 1,694,792, granted to the Ajax Electrothermic Corporation, of Trenton, New Jersey, as assignee of E. F. Northrup.

The material herein disclosed, having the qualities of gassing relatively little, packing more readily than ordinary carbon black, and having a reactivity with carbon dioxide substantially less than that of natural or artificial graphite, may be used as an insulating material for furnaces fired by gas, oil, coal, coke and the like, or for insulating furnaces heated by electrical resistance material such as nickel, chromium wire and resistance wires of other materials, granular carbon, graphite blocks, pressed material made of graphite and carborundum as made by the Carborundum Company and sold under the trade name of "Globar". The present insulating material may also be used in high frequency induction furnaces adapted for the melting of tungsten carbide, making heat treating or refractory testing furnaces with black body conditions using Acheson graphite linings surrounded with carbon of the present invention, and melting osmium-iridium and similar alloys for fountain pen points. The material may also be used around crucibles in induction furnaces, in melting metals which are not affected by carbon, as for example copper, silver and alloys. The material may also be used as a packing around conducting linings for graphitizing amorphous carbon, such as coke. It is also suitable as an insulating material in furnaces adapted to treat high melting point carbides such as calcium carbide.

What I claim is:

1. A refractory heat insulating medium comprising a compacted body of granular non-flocculent carbon black particles of thermal decomposition possessing the distinguishing characteristics that at high temperatures it gases relatively little, and its reactivity with carbonic acid at 1000° C. is substantially less than that of natural or artificial graphite.

2. A refractory heat insulating medium comprising a compacted body of granular non-flocculent carbon black particles of thermal decomposition possessing the distinguishing characteristics that the particles thereof pack more readily than ordinary carbon black and lamp black, at high temperatures said body gases relatively little, and its reactivity with carbon dioxide at 1000° C. is substantially less than that of natural or artificial graphite.

3. A refractory heat insulating material comprising a compacted body of granular non-flocculent carbon black particles of thermal decomposition possessing the distinguishing characteristics that the particles thereof have a true density varying between approximately 1.84 and 1.9, at high temperatures said body gases relatively little, and its reactivity with carbonic acid at 1000° C. is substantially less than that of natural or artificial graphite.

4. A refractory heat insulating medium comprising a compacted body of carbon black particles of thermal decomposition, said particles possessing the distinguishing characteristics that the particles thereof are in a non-flocculent, granular state and in an uncompacted condition and weigh approximately 20 to 40 pounds per cubic foot.

5. A refractory heat insulating material comprising a compacted body of carbon black particles of thermal decomposition possessing the distinguishing characteristics that the particles thereof are in a non-flocculent granular state, in an uncompacted condition, weigh approximately 20 to 40 lbs. per cubic foot, and have an electrical resistance approximately ten times greater than graphite.

6. A heat insulator comprising a body of compacted granular non-flocculent carbon black particles of thermal decomposition.

7. A heat insulator comprising a body of compacted granular non-flocculent carbon black particles of thermal decomposition, said body having a relatively high pore space.

8. A heat insulator characterized by the quality of gassing relatively little and having relatively high pore space, comprising a body of compacted granular non-flocculent carbon black particles of thermal decomposition.

9. A heat insulator comprising a compacted body of granular non-flocculent carbon black particles of thermal decomposition, said body having a relatively high pore space and an electric resistance many times that of graphite.

10. An insulator resistant to high temperatures comprising a compacted body of fine granular carbon black particles of thermal decomposition very inert with respect to oxidation, said body presenting high pore space and having high electrical resistance.

11. A heat insulator comprising a body of compacted carbon black particles of thermal decomposition, said particles being characterized by a granular non-fluffy structure possessing very low combustibility and having a weight when uncompressed of 20 to 40 pounds per cubic foot.

12. The herein described heat insulator comprising a body of compacted non-flocculent granular carbon black particles of thermal decomposition, said body having high pore space and characterized by the property of substantially retaining its permanence of form at high temperatures.

IRA H. DERBY.